United States Patent
Muhammad et al.

(10) Patent No.: US 12,499,384 B2
(45) Date of Patent: Dec. 16, 2025

(54) USER EQUIPMENT ARTIFICIAL INTELLIGENCE-MACHINE-LEARNING CAPABILITY CATEGORIZATION SYSTEM, METHOD, DEVICE, AND PROGRAM

(71) Applicant: RAKUTEN MOBILE, INC., Tokyo (JP)

(72) Inventors: Awn Muhammad, Tokyo (JP); Koichiro Kitagawa, Tokyo (JP); Krishnakumar Kesavan, San Mateo, CA (US); Taewoo Lee, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 730 days.

(21) Appl. No.: 17/795,400

(22) PCT Filed: Apr. 28, 2022

(86) PCT No.: PCT/US2022/026646
§ 371 (c)(1),
(2) Date: Jul. 26, 2022

(87) PCT Pub. No.: WO2023/211439
PCT Pub. Date: Nov. 2, 2023

(65) Prior Publication Data
US 2023/0351248 A1    Nov. 2, 2023

(51) Int. Cl.
*G06F 15/16* (2006.01)
*G06N 5/04* (2023.01)
*G06N 20/00* (2019.01)

(52) U.S. Cl.
CPC .............. *G06N 20/00* (2019.01); *G06N 5/04* (2013.01)

(58) Field of Classification Search
CPC .................................. G06N 5/04; G06N 20/00
USPC ......................................................... 709/220
See application file for complete search history.

(56) References Cited

U.S. PATENT DOCUMENTS

| | | | | |
|---|---|---|---|---|
| 11,516,311 B2* | 11/2022 | Klein | ..................... | G06N 20/00 |
| 11,622,291 B2* | 4/2023 | Pantelidou | ............ | H04W 24/10 |
| | | | | 370/252 |
| 11,741,191 B1* | 8/2023 | Zilka | ..................... | G06N 20/00 |
| | | | | 706/12 |
| 11,844,145 B2* | 12/2023 | Elshafie | ................. | H04W 24/02 |
| 11,968,281 B2* | 4/2024 | Klein | ..................... | H04L 67/63 |
| 12,089,291 B2* | 9/2024 | Zhu | ..................... | H04L 41/0803 |

(Continued)

OTHER PUBLICATIONS

Written Opinion dated Aug. 26, 2022 issued by the International Searching Authority in Application No. PCT/US2022/26646.

(Continued)

*Primary Examiner* — Moustafa M Meky
(74) *Attorney, Agent, or Firm* — Sughrue Mion, PLLC

(57) ABSTRACT

A method, system, apparatus, and non-transitory computer-readable medium for classifying machine-learning capabilities of a user device in a telecommunication network may be provided. The method may be performed by one or more processors, and may include receiving user device capability information from the user device; based on the user device capability information, determining a classification of machine learning capabilities of the user device; and transmitting, to the user device, data associated with a machine learning model based on the classification of the machine learning capabilities of the user device.

20 Claims, 7 Drawing Sheets

(56) References Cited

U.S. PATENT DOCUMENTS

| | | | |
|---|---|---|---|
| 12,120,774 B2* | 10/2024 | Tomala | G06N 20/00 |
| 12,147,500 B2* | 11/2024 | Zilka | G06N 20/00 |
| 12,245,129 B2* | 3/2025 | Gulati | G06N 20/00 |
| 2016/0253498 A1 | 9/2016 | Valencia et al. | |
| 2020/0367051 A1 | 11/2020 | Wang et al. | |
| 2022/0116764 A1 | 4/2022 | Pezeshki et al. | |
| 2022/0239758 A1* | 7/2022 | Klein | G06N 20/00 |
| 2022/0279341 A1* | 9/2022 | Tomala | G06N 20/00 |
| 2022/0342713 A1* | 10/2022 | Shen | G06F 9/5027 |
| 2022/0383066 A1* | 12/2022 | Anicic | G06N 5/02 |
| 2022/0400371 A1* | 12/2022 | Elshafie | H04L 25/0226 |
| 2023/0004864 A1* | 1/2023 | Wang | H04W 24/04 |
| 2023/0044727 A1* | 2/2023 | Pantelidou | G06N 5/04 |
| 2023/0100253 A1* | 3/2023 | Zhu | G06N 3/0464 |
| | | | 706/26 |
| 2023/0262478 A1* | 8/2023 | Hu | H04W 16/18 |
| | | | 370/254 |
| 2023/0276208 A1* | 8/2023 | Ren | H04W 52/0251 |
| | | | 370/329 |
| 2023/0276338 A1* | 8/2023 | Gulati | H04W 4/38 |
| | | | 455/63.4 |
| 2023/0344725 A1* | 10/2023 | Wang | H04W 24/02 |
| 2023/0350978 A1* | 11/2023 | Zilka | G06N 3/02 |
| 2023/0388817 A1* | 11/2023 | Rydén | H04W 24/02 |
| 2023/0422117 A1* | 12/2023 | Li | H04W 36/0058 |
| 2025/0077618 A1* | 3/2025 | Zilka | G06V 10/82 |
| 2025/0247690 A1* | 7/2025 | Ren | H04W 8/24 |

OTHER PUBLICATIONS

International Search Report dated Aug. 26, 2022 issued by the International Searching Authority in Application No. PCT/US2022/26646.

Rakuten Mobile Inc., "AI/ML Model Life Cycle Management", 3GPP TSG RAN WG1 #109-e, R1-2205065, May 9-May 20, 2022, pp. 1-6 (6 pages total).

Samsung Electronics Co., Ltd., Discussion on AI/ML (updated), 3GPP TSG SA WG4 117-e Meeting, S4-220086, Feb. 14-24, 2022, pp. 1-9 (9 pages total).

Rakuten Mobile, "AI based enhancements for Physical Layer", 3GPP TSG RAN Rel-18 workshop, RWS-210198, Jun. 28-Jul. 2, 2021, pp. 1-9 (9 pages total).

* cited by examiner

USER EQUIPMENT ARTIFICIAL INTELLIGENCE-MACHINE-LEARNING CAPABILITY CATEGORIZATION SYSTEM, METHOD, DEVICE, AND PROGRAM

CROSS REFERENCE TO RELATED APPLICATIONS

This application is a National Stage of International Application No. PCT/US2022/026646 filed Apr. 28, 2022.

FIELD

The present disclosure relates to categorizing or classifying user equipment or user device capabilities related to artificial intelligence and machine-learning (AI/ML). In particular, the present disclosure relates to classifying capabilities of user equipment or user devices connected to or part of a telecommunication network relating to the training, updating, and inference of AI/ML models.

BACKGROUND

In a telecommunication network, a plurality of functions performed by the components of the may be optimized using AI/ML modelling. However, there are no existing standards or even discussion relating to the use of AI/ML in a telecommunication network. The application and use of AI/ML to improve services provided by components of a telecommunication network propose unique challenges. For example, a related art method of defining a new capability of the telecommunication network may include defining the new capability in terms of radio-frequency parameters, featureSetCombinations, or featureSets. However, such methods may not be enough for defining the capabilities of user equipment because of integration and verification issues relating to the user equipment's capabilities.

Therefore, to effectively leverage AI/ML usage, categorization of the user equipment processing capabilities may be needed to optimize functions or services performed by the components of the telecommunication network.

SUMMARY

According to embodiments of the present disclosure, a method for classifying machine-learning capabilities of a user device in a telecommunication network may be provided. The method may be executed by a processor, and the method may include: receiving user device capability information from the user device; based on the user device capability information, determining a classification of machine learning capabilities of the user device; and transmitting, to the user device, data associated with a machine learning model based on the classification of the machine learning capabilities of the user device.

According to embodiments of the present disclosure, the user device capability information may include a plurality of parameters associated with the user device, and wherein each parameter is expressed as a categorical variable.

According to embodiments of the present disclosure, the plurality of parameters associated with the user device may include at least one of a processor type of the user device, a size of available memory, a battery power of the user device, a battery health of the user device, a device type of the user device, or radio frequency hardware capability of the user device.

According to embodiments of the present disclosure, the determining the classification may include evaluating one or more parameters of the user device from the plurality of parameters; determining a categorical value for each of the one or more parameters; and based on comparing the categorical value for each of the one or more parameters to a pre-determined set of minimum categorical values, assigning a classification number to the user device based on the categorical value for each of the one or more parameters.

According to embodiments of the present disclosure, the transmitting data associated with a machine-learning model user device may include based on the classification of the machine-learning capabilities of the user device, transmitting, to the user device, one of: training data and model parameters for a full scale training at the user device; a lightly trained model, a subset of the training data, and the model parameters for a lightweight training at the user device; a general trained model, a subset of training data, and the model parameters for a specific use case-based update of the general trained model at the user device; and a trained model for an inference at the user device.

According to embodiments of the present disclosure, the specific use case-based update for the general trained model is associated with a use case from among a channel-state information (CSI) feedback enhancement, beam management, positioning accuracy, received signal (RS) overhead reduction, load balancing, mobility optimization, or network energy saving.

According to embodiments of the present disclosure, the lightweight training at the user device includes updating the lightly trained model for a limited number of epochs to achieve an acceptable level of accuracy.

According to embodiments of the present disclosure, the full-scale training at the user device includes generating the machine-learning model using the training data and the model parameters, wherein the generating includes training a model for a large number of epochs to achieve a high level of accuracy.

According to embodiments of the present disclosure, the classification of the machine-learning capabilities of the user device is indicative of an artificial intelligence model training capacity of the user device.

According to embodiments of the present disclosure, the classification of the machine-learning capabilities of the user device is indicative of an artificial intelligence model inference capacity of the user device.

According to embodiments of the present disclosure, the receiving of the user device capability information is in response to receiving a request from the user device.

According to embodiments of the present disclosure, the receiving of the user device capability information is in response to receiving a request from a network element of the telecommunication network.

According to embodiments of the present disclosure, an apparatus including a memory configured to store instructions and one or more processors configured to execute the instructions may be provided. The instructions may include instructions to receive user device capability information from the user device; based on the user device capability information, determine a classification of machine-learning capabilities of the user device; and transmit, to the user device, data associated with a machine-learning model based on the classification of the machine-learning capabilities of the user device.

According to embodiments of the present disclosure, non-transitory computer-readable medium storing instructions may be provided. The instructions when executed by a network element comprising one or more processors, may cause the one or more processors to receive user device capability information from the user device; based on the user device capability information, determine a classification of machine-learning capabilities of the user device; and transmit, to the user device, data associated with a machine-learning model based on the classification of the machine-learning capabilities of the user device.

BRIEF DESCRIPTION OF THE DRAWINGS

Features, advantages, and significance of exemplary embodiments of the disclosure will be described below with reference to the accompanying drawings, in which like signs denote like elements.

DETAILED DESCRIPTION

Figure 1:
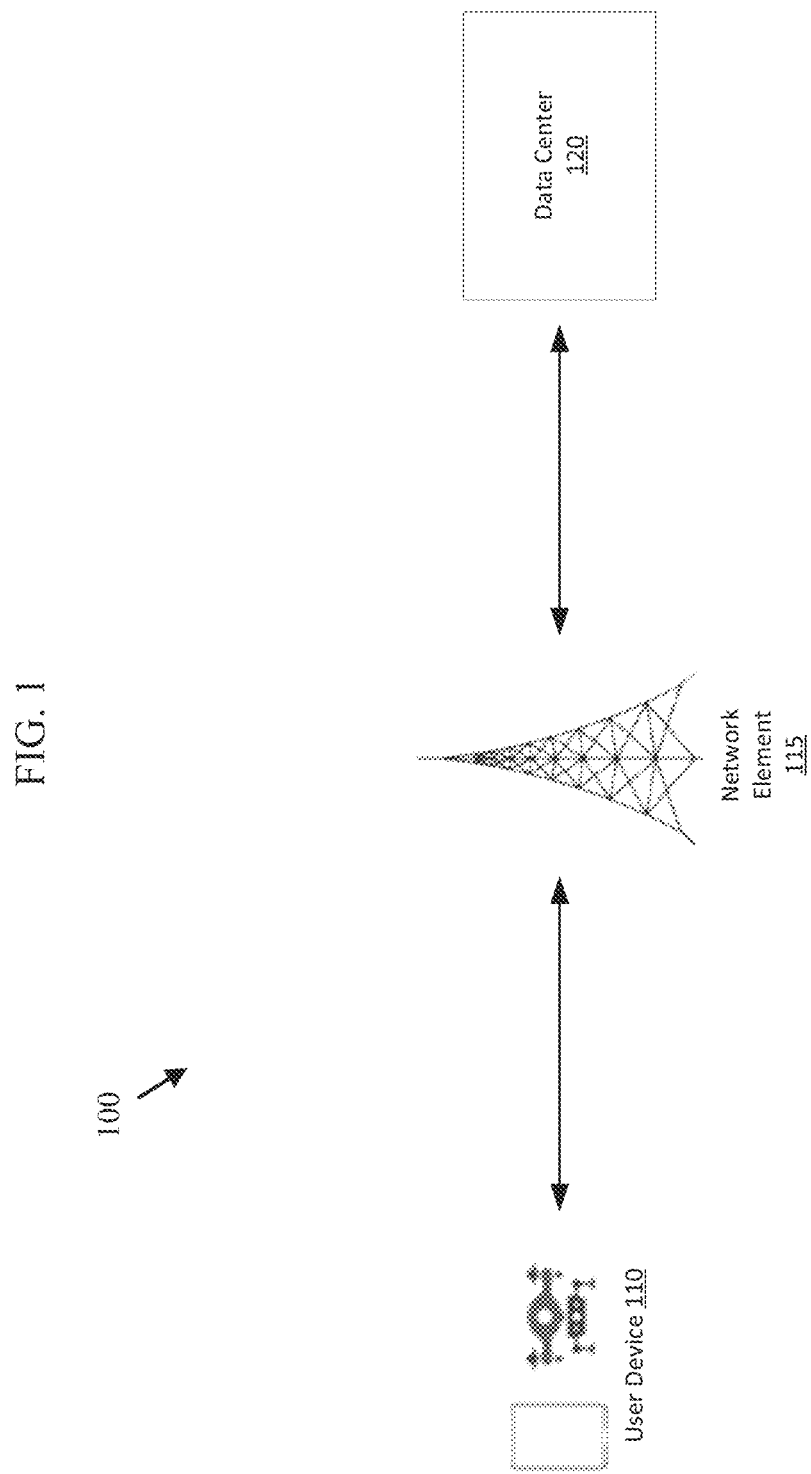
FIG. 1 is an example diagrammatic illustration of a network architecture in which the systems and/or methods described in the present disclosure may be implemented.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

As stated above, there are no existing standards relating to the use of AI/ML in a telecommunication network. Categorization of the user equipment (UE) or user device processing capabilities is needed to effectively leverage AI/ML usage to optimize functions or services performed by the components of the telecommunication network. However, the application and use of AI/ML to improve services provided by components of a telecommunication network proposes unique challenges. For example, related art methods of defining a new capability of the telecommunication network may include defining the new capability in terms of radio-frequency parameters, featureSetCombinations, or featureSets. However, such related art methods may not be enough for defining the capabilities of user equipment because of integration and verification issues relating to the UE's capabilities.

In addition, for optimal performance of the telecommunication network or the optimal performance of user device, a combination of AI/ML models may be needed, but training the models at every UE for different types of environment may be a strain on the resources of the telecommunication network and the user device. As an example, geographical location of the network element or UE (e.g., area type, indoor area, shielded area, etc.), type of UE (smartphone, laptop, drone, etc.), UE processor speed, network element bandwidth, operating frequency band, type of network element (e.g., base station-macro or micro), other UE hardware and software capabilities, etc., may affect the model that may be used and where the model nay be trained, updated, or used for inference.

Therefore, categorization of the user equipment processing capabilities to leverage AI/ML usage in a telecommunication network may be needed to optimize functions or services performed by the components of the telecommunication network or the user device. One of the advantages of categorization or classification of UE processing capabilities is easier and simpler integration and verification of UE in a telecommunication network with a set of capabilities. Further, categorizing UE's into certain AI/ML capabilities may facilitate UE vendors and network element (e.g., gNode B (gNB)) vendors to focus on set of features instead of huge combination of features. Finally, focusing on certain AI/ML processing capabilities of the UE to determine the category or classification of the UE may reduce amount of information exchanged, increasing the efficiency of the telecommunication network.

Embodiments of the present disclosure relate to categorizing or classifying the machine-learning capabilities of a user device connected to a telecommunication network using the processing capability of the user device, and then, based on the classification of the machine-learning capabilities of the user device, transfer either (1) data to train an AI/ML model at the user device of a telecommunication network to optimize a function or goal of the telecommunication network or (2) transfer a partially or fully trained AI/ML model to the user device of a telecommunication network to optimize a function or goal of the telecommunication network. Using a categorization or a classification of the AI/ML related processing capabilities of the user device may be a very resource efficient and succinct method to decide the location of where the various stages of the AI/ML model such as model training, model tuning/updating, and model inference may take place. If a user device has a high processing capacity, the user device may be used to perform a full-scale training of the AI/ML model, utilizing resources from the user device. On the other hand, if the user device has a low processing capacity, the user device may be used to perform only inference on the basis of an AI/ML model that may be trained at a network element or node utilizing resources from the telecommunication network.

FIG. 1 is an exemplary diagrammatic illustration of a snippet of a network architecture in which the systems and/or methods described in the present disclosure may be implemented.

As shown in FIG. 1, the network infrastructure 100 of a telecommunication network may include one or more user device 110, one or more network element 115, and one or more data center.

According to embodiments, the user device 110 may be any device used by an end-user to communicate using the telecommunication network. The user device 110 may communicate with the network element 115 through a radio channel. The user device 110 may be replaced by a 'terminal', 'user equipment (UE)', a 'mobile station', a 'subscriber station', customer premises equipment (CPE)', a 'remote terminal', a 'wireless terminal', a 'user device', 'device,' 'laptop,' 'computing device,' or other terms having the technical meaning equivalent thereto. According to embodiments of this disclosure, depending on the user device capability information, an AI/ML model may be trained, updated, and/or deployed on the user device 110. Determining a classification based on user device capabilities will help optimize how and where AI/ML models may be used in a telecommunication network. Additionally, using a classification that, once calculated, may be easy to transmit a plurality of times, may reduce the overhead of the telecommunication network.

In some embodiments, the user device 110 may communicate with the telecommunication network using network element 115 such as a base station. An example of a base station may be gNodeB or an eNodeB. The network element 115 may be a node that enables communication between a user device 110 and the telecommunication system using a radio channel. The network element 115 may be a network infrastructure component, which may provide a wireless connection to the user device 110. The network element 115 may have a coverage defined as a certain geographical region also known as a sector based on a signal transmittable distance.

According to embodiments of the present disclosure, depending on the user device capability information, an AI/ML model may be trained, updated, and/or deployed on the network element 115. Determining a classification based on user device capabilities will help optimize how and where AI/ML models may be used in a telecommunication network. Additionally, using a classification that, once calculated, may be easy to transmit a plurality of times, may reduce the overhead of the telecommunication network. In some embodiments, the network element 115 may also receive and transmit the data associated with the AI/ML model between the data center 120 and the user device 110.

According to some embodiments, the network infrastructure 100 may include one or more data center 120. The data center may store the data associated with the AI/ML model's training, testing, and validation. The data center 120 may transmit the data to the network element 115 which may further transmit the data to the user device 110.

The data center 120 may include one or more central data centers, one or more regional data centers, and one or more edge data centers. A data center may be primarily responsible for driving content delivery, providing network functions, providing network services, mobile services, and cloud services. As an example, a data center 120 may be the central data center driving telecommunication network services in a large geographical region such as a city, district, county, or state. A regional data center may drive telecommunication network services on a regional level. A central data center may include a plurality of regional data centers. An edge data center may drive telecommunication network services on a locality level. A regional data center may include a plurality of edge data centers. In some embodiments, each edge data center may provision telecommunication services via a plurality of base stations, nodes, or network elements 115.

Figure 2:
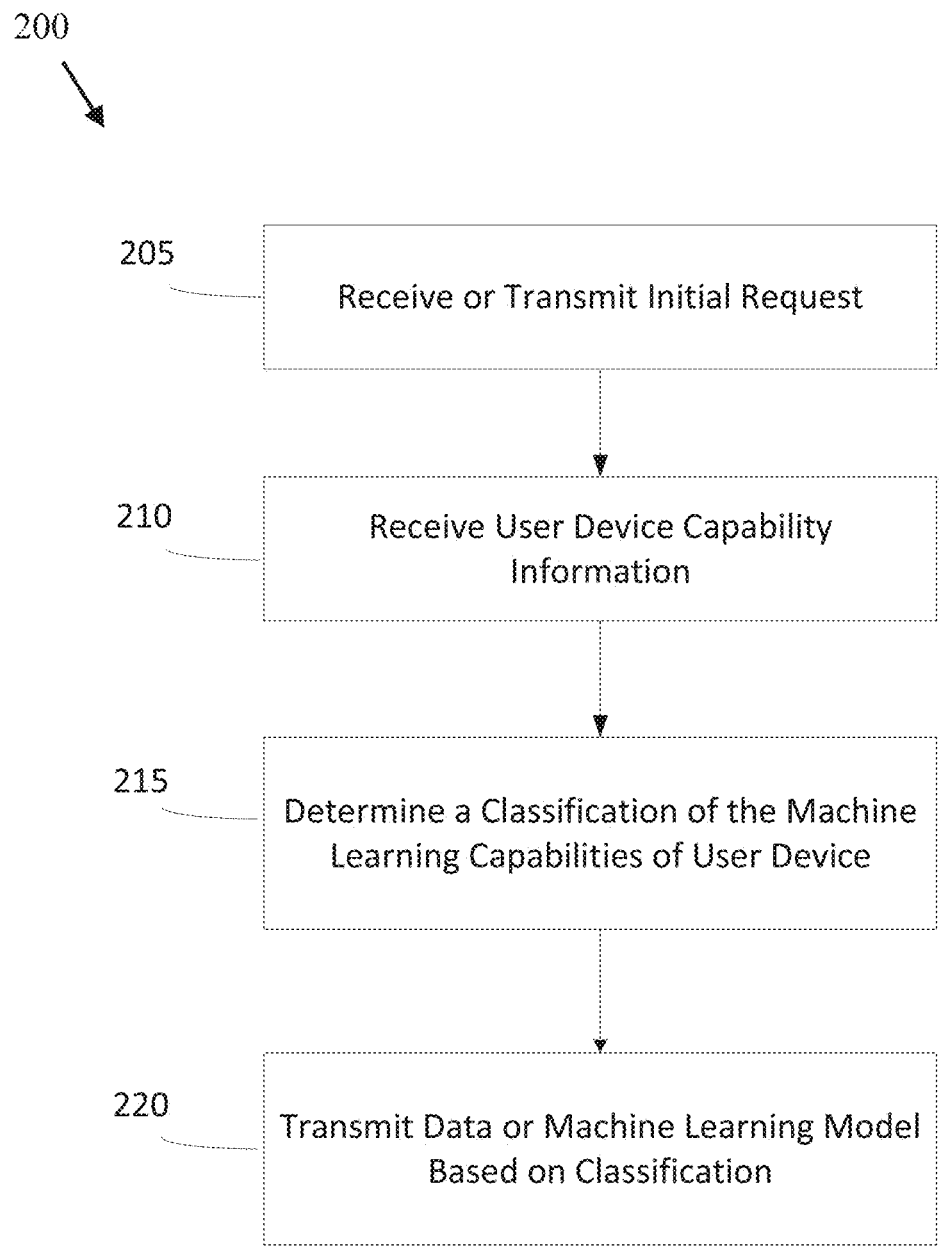
FIG. 2 is an exemplary flowchart illustrating an example process for classifying machine-learning capabilities of a user device in a telecommunication network, according to embodiments of the present disclosure.

FIG. 2 is an exemplary flowchart illustrating an example process 200 for classifying machine-learning capabilities of a user device in a telecommunication network, according to embodiments of the present disclosure.

Figure 6:
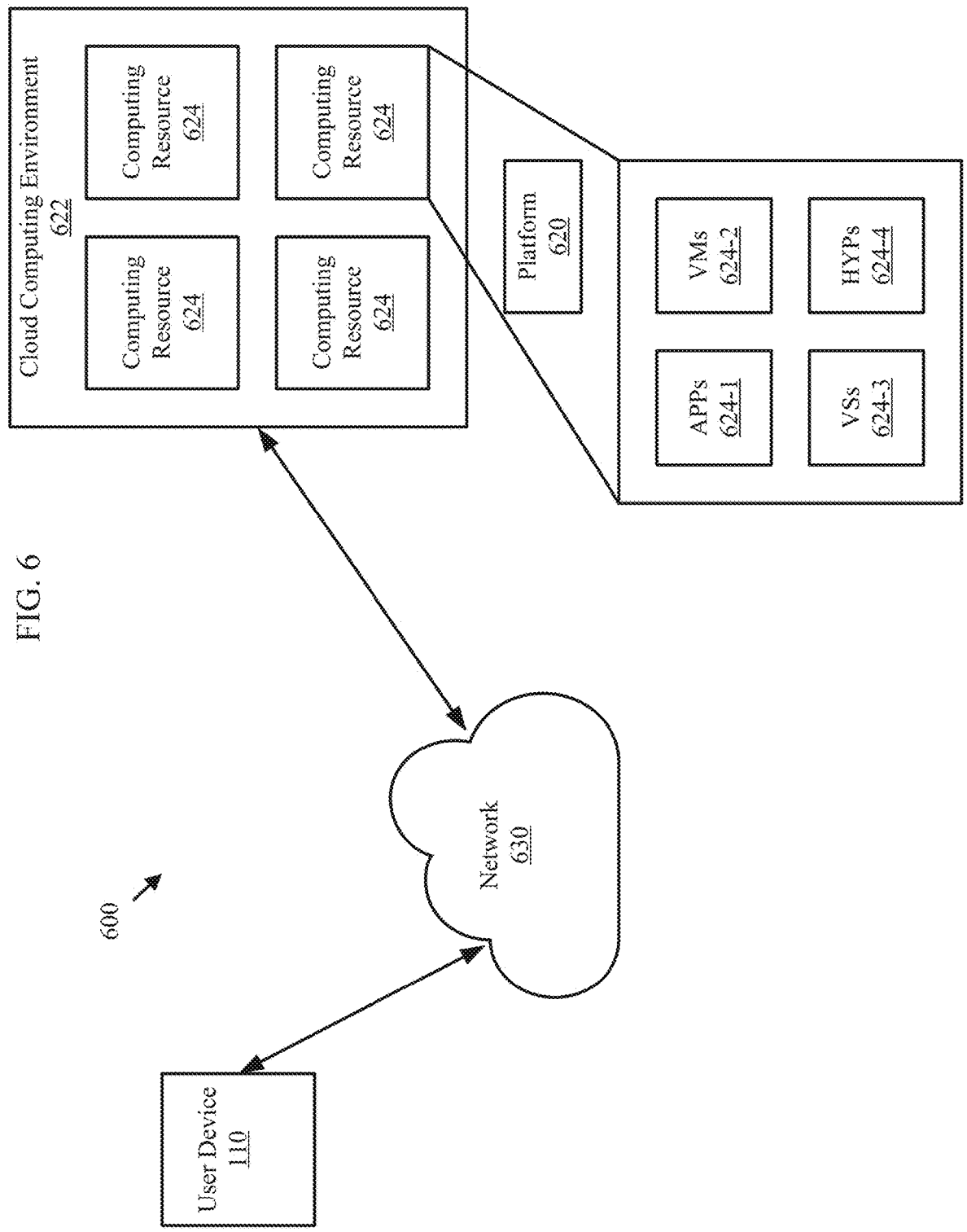
FIG. 6 is a diagram of example components of one or more devices of FIG. 1, according to embodiments of the present disclosure.
Figure 7:
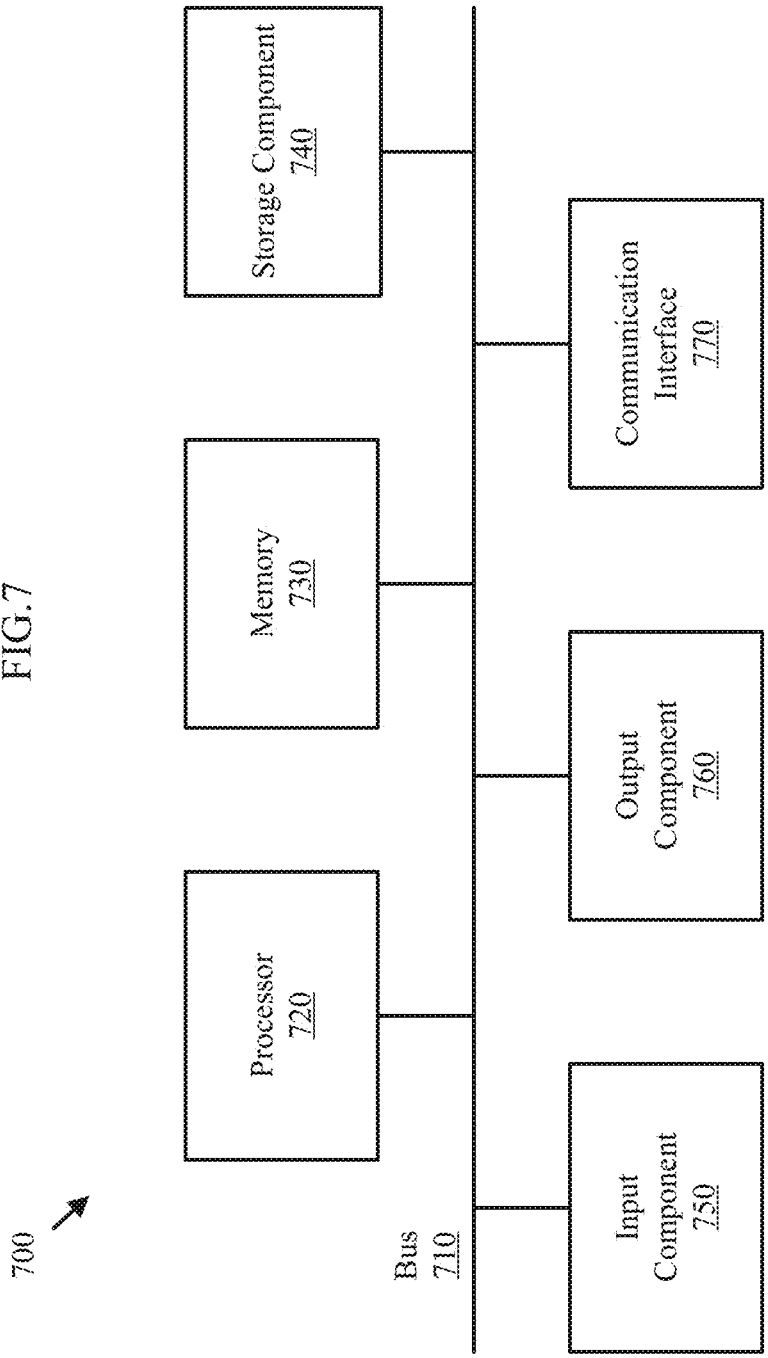
FIG. 7 is a diagram of example components of one or more devices of FIG. 1, according to embodiments of the present disclosure.

As shown in FIG. 2, one or more process blocks of processes 200 may be performed by any of the components of FIGS. 1 and 6-7 discussed in the present application. In FIG. 2, one or more process blocks of processes 200 may correspond to the operations associated with a network element such as a cell, base station, or node.

At operation 205, an initial request for AI/ML capabilities of the user device may be requested or transmitted. In some embodiments, the network element may receive a request for AI/ML capabilities of the user device from the user device. In some embodiments, the network element, such as a cell or node (e.g., gNodeB or eNodeB) may initiate or transmit a request to the user device for AI/ML capabilities of the user device. As an example, network element 115 may transmit or receive from user device 110, an initial request for AI/ML capabilities of the user device.

At operation 210, user device capability information may be received. In some embodiments, the user device capability information may include a plurality of parameters associated with the user device. The plurality of parameters associated with the user device may include one or more of a processor type of the user device, a size of available memory, a battery power of the user device, a battery health of the user device, a device type of the user device, or radio frequency hardware capability of the user device. As an example, the processor type of user device may indicate whether the processor is a neural processing unit (NPU) or a graphical processing unit (GPU). As another example, the battery power of the user device may indicate the battery capacity or battery health of the user device's battery. The device type of the user device may include but not be limited to the user device being a smartphone, a laptop, a drone, or an internet of things enabled device.

Each parameter may be expressed as a categorical variable, i.e., instead of a specific value or range of values, each parameter may be expressed as a category. As an example, the size of the available memory may be expressed as "high," "medium," or "low," wherein the range of values that may be included in high, medium, or low may be defined by a network operator, the network element, or may be learned based on historical data.

In some embodiments, the user device capability information may be received in response to an initial request transmitted by the network element to the user device. In other embodiments, the user device capability information may be received in response to an initial request received by the network element from the user device.

At operation 215, a classification of the AI/ML capability of the user device may be determined. In some embodiments, the classification of the machine-learning capabilities of the user device may indicate an artificial intelligence model training capacity of the user device. As an example, the classification of the machine-learning capabilities of the user device may indicate the feasibility of training an AI/ML model at the user device. As another example, the classification of the machine-learning capabilities of the user device may indicate the infeasibility of training an AI/ML model at the user device but may indicate the feasibility of updating a partially or completely trained AI/ML model at the user interface.

The classification of the machine-learning capabilities of the user device may also indicate an artificial intelligence model inference capacity of the user device. In some embodiments, the classification of the machine-learning capabilities of the user device may indicate that using a fully trained AI/ML model only for inference at the user device may be most feasible.

In some embodiments, the classification of the machine-learning capabilities of the user device may be represented using a number or label. The number used may be in any numerical system, such as decimal, binary, hexadecimal, etc. The numbers or labels used may be pre-defined or network-defined. In some embodiments, the higher the classification, the more capable the user device may be. As an example, a classification of 1 may indicate that the user device may be feasible only for model inference and not model training. Vice versa may also be true. A classification of 1 may indicate that the user device is highly capable and training a full-scale AI/ML model may be feasible at the user device.

The determination of the classification of the machine-learning capabilities of the user device may include evaluating one or more parameters of the user device from the plurality of parameters. Then, a categorical value for each of the one or more parameters of the user device may be determined. Based on comparing the categorical value for each of the one or more parameters to a pre-determined set of minimum categorical values, classification number may be assigned to the user device based on the categorical value for each of the one or more parameters.

In some embodiments, evaluating the one or more parameters of the user device from the plurality of parameters may include selecting one or more parameters from the plurality of parameters based on a use case for the machine-learning model. Examples of use-cases may include but may not be limited to are a channel-state information (CSI) feedback enhancement, beam management, positioning accuracy, received signal (RS) overhead reduction, load balancing, mobility optimization, or network energy saving.

The determining of a categorical value for each of the one or more parameters of the user device may include parsing the user device capability information received from the user device. In some embodiments, the user device may be separately polled to determine the categorical value for any of the one or more parameters of the user device.

A classification number may be assigned to the user device based on the categorical value for each of the one or more parameters based on comparing the categorical value for each of the one or more parameters to a pre-determined set of minimum categorical values. In some embodiments, a pre-determined set of minimum categorical values may be a set of categorical values for the parameters selected from the plurality of parameters based on a use case for the machine-learning model. Below is a table that provides an exemplary pre-determined set of minimum categorical values for the parameters. This is not intended to be a limitation. It may be understood that there may be many combinations of parameters selected as well as the minimum categorical value sets for those parameters. The network element or the network operator may define such combinations and minimum categorical value sets.

TABLE 1

| Classification/ Category | NPU/ GPU Capacity | Memory/ Buffer | UE Battery | RF Hardware Capability | Model Training at UE | Model Update | Partial Model Transfer | Inference Transfer | Inference Update | Training |
|---|---|---|---|---|---|---|---|---|---|---|
| 1 | Low | Low | Low | Low | N | N | N | Y | Y | — |
| 2 | Med | Med | Med | — | N | Y | Y | Y | Y | — |
| 3 | High | High | High | High | Y | Y | Y | Y | Y | Light Training |
| 4 | High | High | High | High | Y | Y | Y | Y | Y | Full Training |

As seen above, in Table 1, for a user device that has a low capacity processor, low memory available, low battery power, and low RF hardware capability, it may be feasible to only transfer AI/ML model inference to the user device. It may also indicate that it may be infeasible to perform full-scale or partial AI/ML model training at the user device in the instant example.

At operation 220, data associated with a machine-learning model may be transmitted based on the classification of the AI/ML capability of the user device. The machine-learned model that may be generated, trained, updated, or transmitted may be based on any type of AI/ML technique known in the art, including but not limited to supervised learning, unsupervised learning, semi-supervised learning, reinforcement learning, deep learning, transfer learning, and/or meta learning.

The data that may be transmitted may be based on the classification of the machine-learning capabilities of the user device. In some embodiments, one of the following may be transmitted to the user device based on the classification of the machine-learning capabilities of the user device. In some embodiments, training data and model parameters for a full-scale training at the user device may be transmitted based on the classification of the machine-learning capabilities of the user device indicating a highly capable user device. The full-scale training at the user device may include generating the machine-learning model using the training data and the model parameters, wherein the generating may include training a model for a large number of epochs to achieve a high level of accuracy. As an example, if the user device is a laptop with high GPU capacity, large memory available, high RF hardware capacity, and high battery power or is currently charging, training data and model parameters may be transmitted so that an AI/ML model may be fully trained at the user device.

In some embodiments, a lightly trained model, a subset of the training data, and the model parameters may be transmitted for a lightweight training at the user device based on the user device being sufficiently capable. The lightweight training at the user device may include updating the lightly trained model for a limited number of epochs to achieve an acceptable level of accuracy.

In some embodiments, a general trained model, a subset of training data, and the model parameters may be transmitted to the user device for a specific use case-based update of the general trained model at the user device based on the user device being sufficiently capable and/or a neural network being. As an example, if a neural network is used, a general model, trained on another task may be transmitted to the user device for customization using transfer learning. The last few layers of the general model may be retrained and the general model may be updated for the specific use case.

In some embodiments, a fully trained model may be transmitted to the user device for inference at the user device based on the user device having insufficient resources. The utilization of an AI/ML model for inference is deploying the AI/ML model on data unseen by the model. In some embodiments, model inference is applying the rules and/or relationships learned during model training to real world data.

Figure 3:
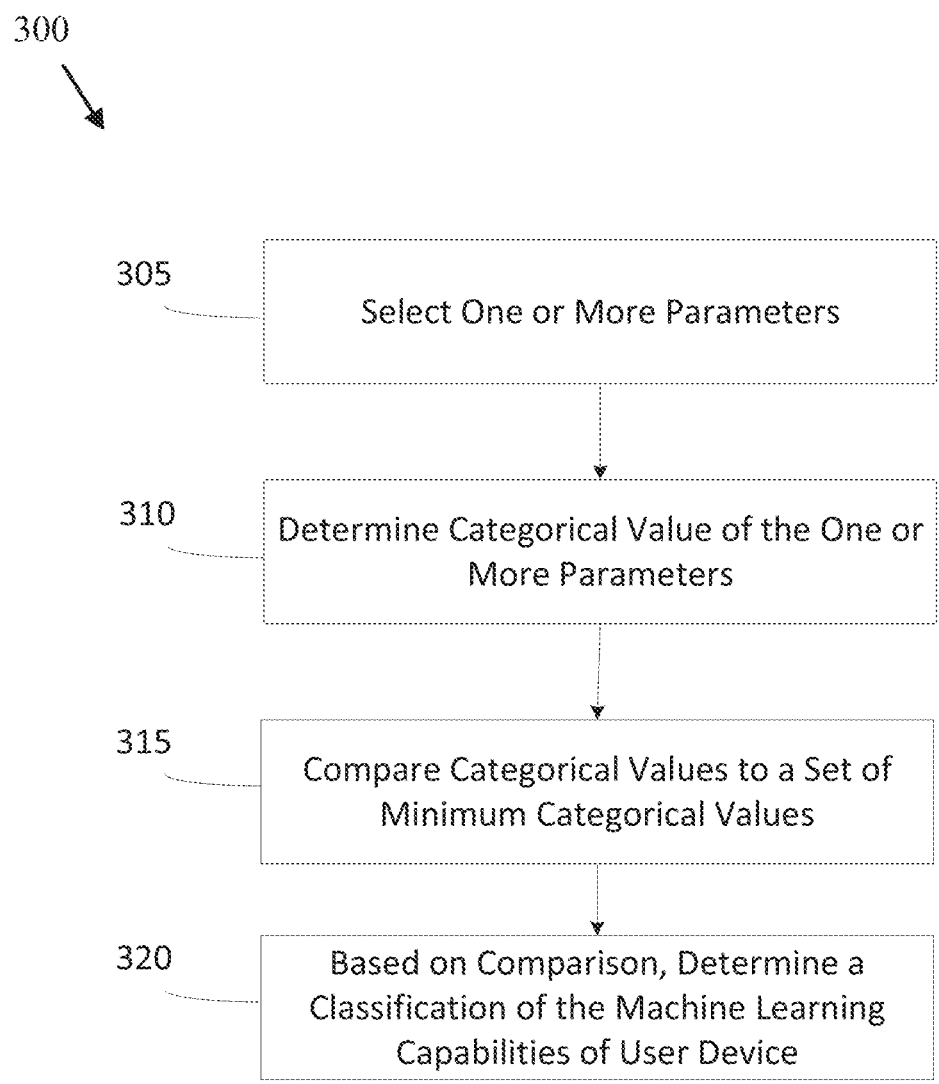
FIG. 3 is an exemplary flowchart illustrating an example process for classifying machine-learning capabilities of a user device in a telecommunication network, according to embodiments of the present disclosure.

FIG. 3 is an exemplary flowchart illustrating an example process 300 for classifying machine-learning capabilities of a user device in a telecommunication network, according to embodiments of the present disclosure.

The process 300 may illustrate the determination of the classification of the AI/ML capability of the user device. In some embodiments, the classification of the machine-learning capabilities of the user device may indicate an artificial intelligence model training capacity of the user device. The process 300 may be performed by the network element such as a cell or node (e.g., gNodeB and eNodeB).

In some embodiments, the classification of the machine-learning capabilities of the user device may indicate an artificial intelligence model training capacity of the user device. The classification of the machine-learning capabilities of the user device may also indicate an artificial intelligence model inference capacity of the user device.

As seen in FIG. 3, the process 300 may include operation 305. At operation 305, the one or more parameters from among a plurality of parameters may be evaluated. Evaluation of the parameter may include selecting one or more parameters from the plurality of parameters based on a use case for the machine-learning model. Examples of use-cases may include but may not be limited to are a channel-state information (CSI) feedback enhancement, beam management, positioning accuracy, received signal (RS) overhead reduction, load balancing, mobility optimization, or network energy saving.

At operation 310, a categorical value for each of the one or more parameters of the user device may be determined. In some embodiments, this determining may include parsing the user device capability information received from the user device. In some embodiments, the user device may be separately polled to determine the categorical value for any of the one or more parameters of the user device.

At operations 315-320, a classification number may be assigned to the user device based on the categorical value for each of the one or more parameters based on comparing the categorical value for each of the one or more parameters to a pre-determined set of minimum categorical values. In some embodiments, a pre-determined set of minimum categorical values may be a set of categorical values for the parameters selected from the plurality of parameters based on a use case for the machine-learning model.

Figure 4:
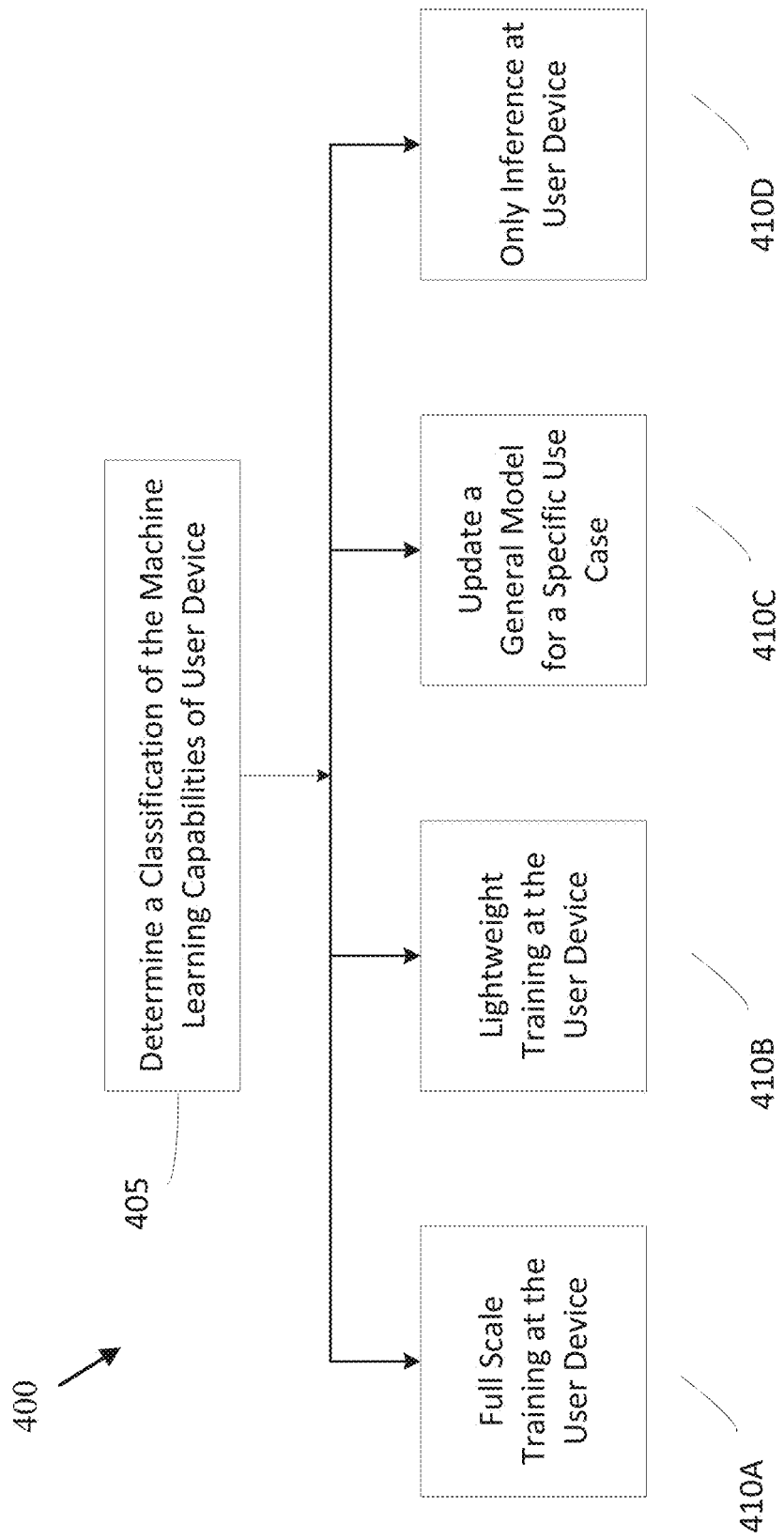
FIG. 4 is an exemplary flowchart illustrating an example process for classifying machine-learning capabilities of a user device in a telecommunication network, according to embodiments of the present disclosure.

FIG. 4 is an exemplary flowchart illustrating an example process 400 for transmitting data associated with a machine-learned model based on the classifying machine-learning capabilities of a user device in a telecommunication network, according to embodiments of the present disclosure.

The process 400 may illustrate the transmitting of data or machine-learned model following the determination of the classification of the AI/ML capability of the user device.

At operation 405, a classification of the machine-learning capabilities of the user device may be determined. In some embodiments, the operations 305-320 performed as a part of process 300 in FIG. 3 may be included in operation 405.

At operation 410A, training data and model parameters for a full-scale training at the user device may be transmitted based on the classification of the machine-learning capabilities of the user device indicating a highly capable user device. The full-scale training at the user device may include generating the machine-learning model using the training data and the model parameters, wherein the generating may include training a model for a large number of epochs to achieve a high level of accuracy.

At operation 410B, a lightly trained model, a subset of the training data, and the model parameters may be transmitted for a lightweight training at the user device based on the user device being sufficiently capable. The lightweight training at the user device may include updating the lightly trained model for a limited number of epochs to achieve an acceptable level of accuracy.

At operation 410C, a general trained model, a subset of training data, and the model parameters may be transmitted to the user device for a specific use case-based update of the general trained model at the user device based on the user device being sufficiently capable and/or a neural network being. As an example, if a neural network is used, a general model, trained on another task may be transmitted to the user device for customization using transfer learning. The last few layers of the general model may be retrained and the general model may be updated for the specific use case.

At operation 410D, a fully trained model may be transmitted to the user device for inference at the user device based on the user device having insufficient resources. The utilization of an AI/ML model for inference is deploying the AI/ML model on data unseen by the model. In some embodiments, model inference is applying the rules and/or relationships learned during model training to real world data.

Figure 5:
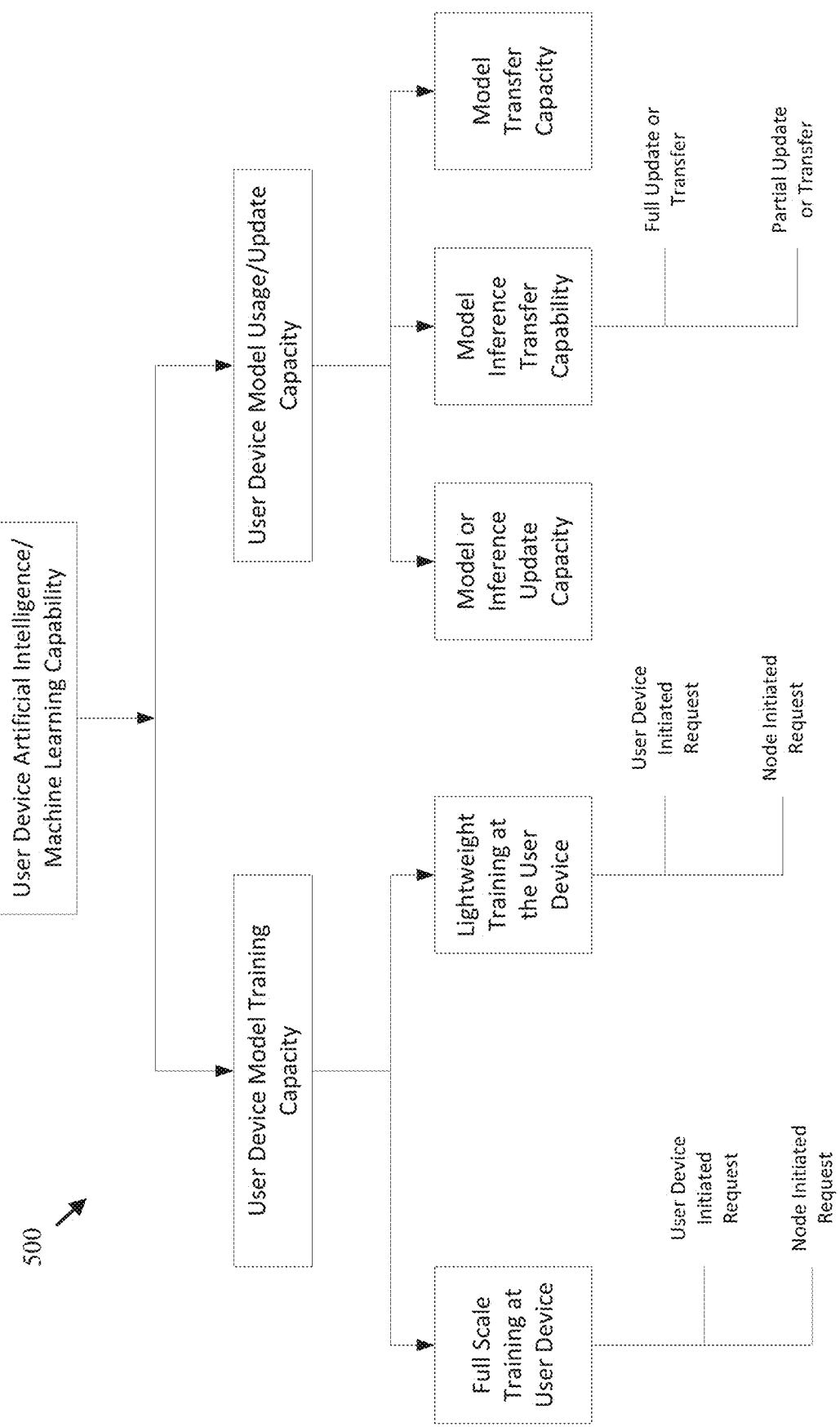
FIG. 5 is an exemplary diagrammatic illustration of for classifying machine-learning capabilities of a user device in a telecommunication network, according to embodiments of the present disclosure.

FIG. 5 is an exemplary diagrammatic illustration of for classifying machine-learning capabilities of a user device in a telecommunication network, according to embodiments of the present disclosure.

As seen in FIG. 5, classification of the user device AI/ML capability may indicate an AI/ML model training capacity of the user device and/or the AI/ML model inference capacity of the user device. Based on the user device having at least some AI/ML model training capacity, either training data and model parameters for full-scale training at the user device or a lightly trained model, a subset of the training data, and the model parameters may be transmitted to the user device. Based on the user device having some AI/ML model update or inference capacity, either a general trained model, a subset of training data, and the model parameters for a specific use case-based update of the general trained model at the user device or a fully trained model for inference at the user device may be transmitted to the user device.

FIG. 6 is a diagram of example components of one or more devices of FIG. 1, according to embodiments of the present disclosure.

As shown in FIG. 6, environment 600 may include a user device 110, a platform 620, and a network 630. Devices of environment 600 may interconnect via wired connections, wireless connections, or a combination of wired and wireless connections. In embodiments, any of the functions of the elements included in network infrastructure 100 may be performed by any combination of elements illustrated in FIG. 6. For example, in embodiments, user device 110 may perform one or more functions associated with a personal computing device, and platform 620 may perform one or more functions associated with any of the network element 115.

The user device 110 may include one or more devices capable of receiving, generating, storing, processing, and/or providing information associated with platform 620. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to platform 620.

Platform 620 may include one or more devices capable of receiving, generating, storing, processing, and/or providing information. In some implementations, platform 620 may include a cloud server or a group of cloud servers. In some implementations, platform 620 may be designed to be modular such that certain software components may be swapped in or out depending on a particular need. As such, platform 620 may be easily and/or quickly reconfigured for different uses.

In some implementations, as shown, platform 620 may be hosted in cloud computing environment 622. Notably, while implementations described herein describe platform 620 as being hosted in cloud computing environment 622, in some implementations, platform 620 is not be cloud-based (i.e., may be implemented outside of a cloud computing environment) or may be partially cloud-based.

Cloud computing environment 622 includes an environment that hosts platform 620. Cloud computing environment 622 may provide computation, software, data access, storage, etc. services that do not require end-user (e.g., user device 110) knowledge of a physical location and configuration of system(s) and/or device(s) that hosts platform 620. As shown, cloud computing environment 622 may include a group of computing resources 624 (referred to collectively as "computing resources 624" and individually as "computing resource 624").

Computing resource 624 includes one or more personal computers, a cluster of computing devices, workstation computers, server devices, or other types of computation and/or communication devices. In some implementations, computing resource 624 may host platform 620. The cloud resources may include compute instances executing in computing resource 624, storage devices provided in computing resource 624, data transfer devices provided by computing resource 624, etc. In some implementations, computing resource 624 may communicate with other computing resources 624 via wired connections, wireless connections, or a combination of wired and wireless connections.

As further shown in FIG. 6, computing resource 624 includes a group of cloud resources, such as one or more applications ("APPs") 624-1, one or more virtual machines ("VMs") 624-2, virtualized storage ("VSs") 624-3, one or more hypervisors ("HYPs") 624-4, or the like.

Application 624-1 includes one or more software applications that may be provided to or accessed by user device 110 or the network element 115. Application 624-1 may eliminate a need to install and execute the software applications on user device 110 or the network element 115. For example, application 624-1 may include software associated with platform 620 and/or any other software capable of being provided via cloud computing environment 622. In some implementations, one application 624-1 may send/receive information to/from one or more other applications 624-1, via virtual machine 624-2.

Virtual machine 624-2 includes a software implementation of a machine (e.g., a computer) that executes programs like a physical machine. Virtual machine 624-2 may be either a system virtual machine or a process virtual machine, depending upon use and degree of correspondence to any real machine by virtual machine 624-2. A system virtual machine may provide a complete system platform that supports execution of a complete operating system ("OS"). A process virtual machine may execute a single program, and may support a single process. In some implementations, virtual machine 624-2 may execute on behalf of a user (e.g., user device 110), and may manage infrastructure of cloud computing environment 622, such as data management, synchronization, or long-duration data transfers.

Virtualized storage 624-3 includes one or more storage systems and/or one or more devices that use virtualization techniques within the storage systems or devices of computing resource 624. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 624-4 may provide hardware virtualization techniques that allow multiple operating systems (e.g., "guest operating systems") to execute concurrently on a host computer, such as computing resource 624. Hypervisor 624-4 may present a virtual operating platform to the guest operating systems, and may manage the execution of the guest operating systems. Multiple instances of a variety of operating systems may share virtualized hardware resources.

Network 630 includes one or more wired and/or wireless networks. For example, network 630 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

FIG. 7 is a diagram of example components of one or more devices of FIG. 1, according to embodiments of the present disclosure.

FIG. 7 is a diagram of example components of a user device 110. The user device 110 may correspond to a device associated with an authorized user, an operator of a cell, or a RF engineer. The user device 110 may be used to communicate with cloud platform 620 via the network element 115. As shown in FIG. 7, the user device 110 may include a bus 710, a processor 720, a memory 730, a storage component 740, an input component 750, an output component 760, and a communication interface 770.

Bus 710 may include a component that permits communication among the components of the user device 110. Processor 720 may be implemented in hardware, firmware, or a combination of hardware and software. Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of the user device 110. For example, storage component 740 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 750 includes a component that permits the user device 110 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). Output component 760 includes a component that provides output information from the user device 110 (e.g., a display, a speaker, and/or one or more light-emitting diodes (LEDs)).

Communication interface 770 includes a transceiver-like component (e.g., a transceiver and/or a separate receiver and transmitter) that enables the user device 110 to communicate with other devices, such as via a wired connection, a wireless connection, or a combination of wired and wireless connections. Communication interface 770 may permit the user device 110 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

The user device 110 may perform one or more processes described herein. The user device 110 may perform these processes in response to processor 720 executing software instructions stored by a non-transitory computer-readable medium, such as memory 730 and/or storage component 740. A computer-readable medium may be defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

As is traditional in the field, embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

What is claimed is:

1. A method for classifying machine-learning capabilities of a user device in a telecommunication network, the method being executed by a processor, and the method comprising:

receiving user device capability information from the user device;

based on the user device capability information, determining a classification of machine-learning capabilities of the user device; and transmitting, to the user device, data associated with a machine-learning model based on the classification of the machine-learning capabilities of the user device.

2. The method of claim 1, wherein the user device capability information includes a plurality of parameters associated with the user device, and wherein each parameter is expressed as a categorical variable.

3. The method of claim 2, wherein the plurality of parameters associated with the user device include at least one of a processor type of the user device, a size of available memory, a battery power of the user device, a battery health of the user device, a device type of the user device, or radio frequency hardware capability of the user device.

4. The method of claim 3, wherein determining the classification comprises:

evaluating one or more parameters of the user device from the plurality of parameters;

determining a categorical value for each of the one or more parameters; and based on comparing the categorical value for each of the one or more parameters to a pre-determined set of minimum categorical values, assigning a classification number to the user device based on the categorical value for each of the one or more parameters.

5. The method of claim 2, wherein transmitting data associated with a machine-learning model to the user device comprises:

based on the classification of the machine-learning capabilities of the user device, transmitting, to the user device, one of:

training data and model parameters for a full scale training at the user device;

a lightly trained model, a subset of the training data, and the model parameters for a lightweight training at the user device;

a general trained model, a subset of training data, and the model parameters for a specific use case-based update of the general trained model at the user device; and a trained model for an inference at the user device.

6. The method of claim 5, wherein the specific use case-based update for the general trained model is associated with a use case from among a channel-state information (CSI) feedback enhancement, beam management, positioning accuracy, received signal (RS) overhead reduction, load balancing, mobility optimization, or network energy saving.

7. The method of claim 5, wherein the lightweight training at the user device includes updating the lightly trained model for a limited number of epochs to achieve an acceptable level of accuracy.

8. The method of claim 5, wherein the full scale training at the user device includes generating the machine-learning model using the training data and the model parameters, wherein the generating includes training a model for a large number of epochs to achieve a high level of accuracy.

9. The method of claim 1, wherein the classification of the machine-learning capabilities of the user device is indicative of an artificial intelligence model training capacity of the user device.

10. The method of claim 1, wherein the classification of the machine-learning capabilities of the user device is indicative of an artificial intelligence model inference capacity of the user device.

11. The method of claim 1, wherein the receiving of the user device capability information is in response to receiving a request from the user device.

12. The method of claim 1, wherein the receiving of the user device capability information is in response to receiving a request from a network element of the telecommunication network.

13. An apparatus comprising:

a memory configured to store instructions; and one or more processors configured to execute the instructions to:

receive user device capability information from the user device;

based on the user device capability information, determine a classification of machine-learning capabilities of the user device; and transmit, to the user device, data associated with a machine-learning model based on the classification of the machine-learning capabilities of the user device.

14. The apparatus of claim 13, wherein the user device capability information includes a plurality of parameters associated with the user device, and wherein each parameter is expressed as a categorical variable.

15. The apparatus of claim 14, wherein the determining the classification comprises:

evaluating one or more parameters of the user device from the plurality of parameters;

determining a categorical value for each of the one or more parameters; and based on comparing the categorical value for each of the one or more parameters to a pre-determined set of minimum categorical values, assigning a classification number to the user device based on the categorical value for each of the one or more parameters.

16. The apparatus of claim 13, wherein transmitting data associated with a machine-learning model to the user device comprises:

based on the classification of the machine-learning capabilities of the user device, transmitting, to the user device, one of:

training data and model parameters for a full scale training at the user device;

a lightly trained model, a subset of the training data, and the model parameters for a lightweight training at the user device;

a general trained model, a subset of training data, and the model parameters for a specific use case-based update of the general trained model at the user device; and a trained model for an inference at the user device.

17. The apparatus of claim 16, wherein the lightweight training at the user device includes updating the lightly trained model for a limited number of epochs to achieve an acceptable level of accuracy, and wherein the full scale training at the user device includes generating the machine-learning model using the training data and the model parameters, wherein the generating includes training a model for a large number of epochs to achieve a high level of accuracy.

18. A non-transitory computer-readable medium storing instructions, the instructions comprising: one or more instructions that, when executed by a network element comprising one or more processors, cause the one or more processors to:
  receive user device capability information from the user device;
  based on the user device capability information, determine a classification of machine-learning capabilities of the user device; and
  transmit, to the user device, data associated with a machine-learning model based on the classification of the machine-learning capabilities of the user device.

19. The non-transitory computer-readable medium of claim 18, wherein the user device capability information includes a plurality of parameters associated with the user device; and wherein determining the classification comprises:
  evaluating one or more parameters of the user device from the plurality of parameters;
  determining a categorical value for each of the one or more parameters; and
  based on comparing the categorical value for each of the one or more parameters to a pre-determined set of minimum categorical values, assigning a classification number to the user device based on the categorical value for each of the one or more parameters.

20. The non-transitory computer-readable medium of claim 18, wherein transmitting data associated with a machine-learning model user device comprises:
  based on the classification of the machine-learning capabilities of the user device, transmitting, to the user device, one of:
    training data and model parameters for a full scale training at the user device;
    a lightly trained model, a subset of the training data, and the model parameters for a lightweight training at the user device;
    a general trained model, a subset of training data, and the model parameters for a specific use case-based update of the general trained model at the user device; and
    a trained model for an inference at the user device.

* * * * *